United States Patent Office 3,644,341
Patented Feb. 22, 1972

---

3,644,341
6-GEM-DIFLUORO PREGNANES
John H. Fried, Palo Alto, Calif., assignor to Syntex Corporation, Panama, Panama
No Drawing. Filed Mar. 3, 1969, Ser. No. 803,955
Int. Cl. C07c *173/00*
U.S. Cl. 260—239.55    24 Claims

---

ABSTRACT OF THE DISCLOSURE

6α,6β-difluoropregn-4-en-3-ones; optionally substituted at C-1,2-with methylene, at C-21 with fluoro or chloro, at C-16 with hydroxy, methyl or methylene, at C-17 with hydroxy or the esters thereof, or C-16 and C-17 are bridged by a cyclic acetal or ketal, optionally there is a double bond between C-1,2; exhibit progestational activity.

---

The present invention relates to novel gem-difluoro steroid derivatives and to novel processes for the preparation thereof.

More particularly, the present invention relates to the novel 6α,6β-difluoro steroids of the following formula:

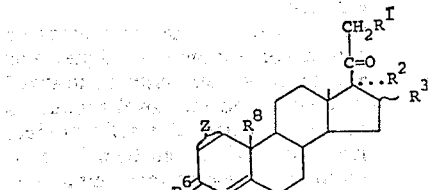

wherein $R^1$ is hydrogen, fluoro or chloro;
$R^2$ is hydrogen, hydroxy, or a conventional hydrolyzable ester;
$R^3$ is hydrogen, hydroxy, methyl or methylene; provided $R^3$ is methyl or methylene when $R^1$ is hydrogen, $R^2$ is hydrogen, hydroxy or a conventional hydrolyzable, and Z is a carbon-carbon single bond or a carbon-carbon double bond; $R^2$ and $R^3$ when taken together are the group

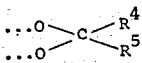

each of $R^4$ and $R^5$ is, independently of each other, hydrogen, lower alkyl, halogenated lower alkyl, monocyclic cycloalkyl, monocyclic cycloalkyl lower alkyl, monocyclic aryl, monocyclic aryl lower alkyl, monocyclic heterocyclic, or monocyclic heterocyclic lower alkyl; or $R^4$ and $R^5$ taken together with the carbon atoms to which they are joined are monocyclic cycloalkylidene or monocyclic heterocyclic ylidene;
$R^6$ is O= or the group

$R^7$ is hydroxy, conventional hydrolyzable ester, tetrahydrofuran-2′-yloxy or tetrahydropyran-2′-yloxy;
$R^8$ is hydrogen or methyl;
Z is a carbon-carbon single bond, a carbon-carbon double bond or a 1α,2α-methylene group; provided Z is a methylene group when $R^1$ is fluoro or chloro or when $R^1$ is hydrogen and $R^2$ and $R^3$ are taken together; and provided $R^8$ is methyl when Z is a double bond or methylene group.

The wavy line at the C-16 position indicates that the $R^3$ substitutent can be either in the α or β-configuration.

Included within the present invention are 6-gem-difluoro steroids optionally substituted at C-1α,2α with a methylene group, at C-16α with hydroxy or methyl, at C-16β with methyl, at C-16 with methylene, at C-17α with hydroxy or ester thereof and at C-21 with fluoro or chloro; and optionally unsaturated at C-1,2. The present novel 6-gem-difluoro steroids are also optionally substituted with an acetal or ketal group bridging the 16α,17α-positions.

The novel 6-gem-difluoro steroids of the present invention possess progestational activity, and accordingly are thus useful in fertility control, the management of dysmenorrhea, the treatment of uterine bleeding, and like conditions in which progestational agents are employed. The compounds of the present invention can be administered by the known pharmacological routes, such as orally, parenterally, or the like. The dosage unit will depend upon various factors including the type of condition being treated, the physical conditions of the patient and the patient's response to the dosage unit. Generally, a dose of about 0.002 to about 0.33 mg. per kilogram of body weight is employed. The compounds are given in conventional forms, such as pills, powders, pellets, syrups, solutions, suspensions and capsule; alone or in conjunction with pharmaceutically acceptable excipients. Representative pharmaceutically acceptable excipients are lactose, magnesium, stearate, water and saline solution.

The term "lower alkyl" denotes a group comprising a straight or branch chain aliphatic hydrocarbon of from 1 to 6 carbon atoms. Typical lower alkyl groups include methyl, ethyl, isopropyl, butyl, hexyl, and the like. The term "halogenated lower alkyl" denotes a lower alkyl substituted with one or more halo atoms, preferably fluoro or chloro. Representative halogenated lower alkyl are trichloromethyl, trifluoromethyl, fluoromethyl, dichloromethyl, 2,2,2-trifluoroethyl, 3-bromopropyl, 4-chloro-4-fluorobutyl, 5,5-dichloropentyl and 6,6-difluorohexyl.

The term "monocyclic cycloalkyl" denotes a group comprising a cyclic hydrocarbon of 5 to 6 carbon atoms, i.e. cyclopentyl and cyclohexyl. The term "monocyclic cycloalkyl lower alkyl" denotes a lower alkyl group substituted with one cycloalkyl substitutent, such as cyclopentylmethyl or 2-cyclohexylethyl.

The term "monocyclic aryl" denotes a phenyl group optionally substituted with 1 to 3 lower alkyl, hydroxy, fluoro, chloro or lower alkyloxy groups. Representative monocyclic aryl are phenyl, tolyl, 2,5-dihydroxyphenyl, fluorophenyl, 3,5 - dichlorophenyl, 2,4,6 - trimethyloxyphenyl and 3,5-diethylphenyl.

The term "monocyclic heterocyclic" and "monocyclic heterocyclic ylidene" denote ring molecules of 5 to 6 carbon atoms containing 1 or 2 oxygen, nitrogen or sulfur atoms in the ring. Typical monocyclic heterocyclics include furan, morpholine, piperidine, pyrrolidine, and the like. Typical monocyclic heterocyclic ylidenes include tetrahydrofuranylidene, pyridylidene, 1-thia-1-oxide-4,4-cyclohexylidene and the like.

The terms "monocyclic aryl lower alkyl" and "monocyclic heterocyclic lower alkyl" denote lower alkyl of from 1 to 6 carbon atoms substituted with a monocyclic aryl or monocyclic heterocyclic group; such as benzyl, phenethyl, tetrahydropyran-4-yl methyl, and 2-(4′-piperidino)ethyl.

The term "conventional hydrolyzable ester" as used herein denotes those hydrolyzable ester groups conventionally employed in the steroid art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon back bone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

The novel gem-difluoro compounds of the present invention are prepared from the corresponding 6-fluoro compounds. The novel process of the present invention can be illustrated by the following reaction sequence:

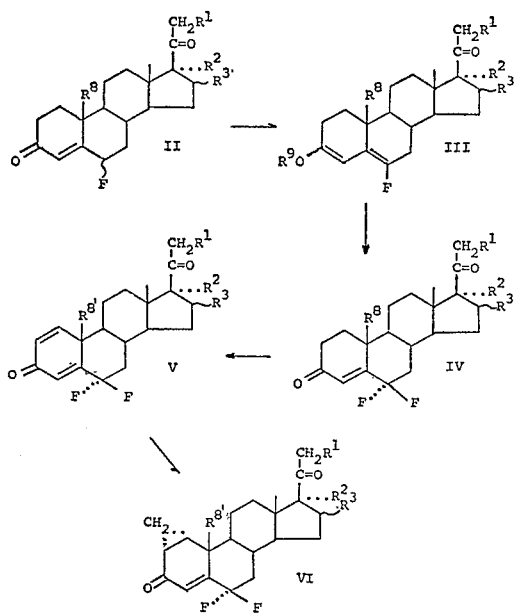

wherein $R^1$, $R^2$, $R^3$ and $R^8$ are as defined hereinbefore,
$R^{8'}$ is methyl;
$R^9$ is lower alkyl, preferably methyl or ethyl.

The present novel 6-gem-difluoro steroids, the compounds of Formula I, can be prepared from the corresponding 6-fluoro steroids, the compounds of Formula II, in two to four steps. In the first step, the 3-alkoxy-$\Delta^{3,5}$-6-fluoro steroids, the compounds of Formula III, are prepared from the corresponding 6-fluoro starting steroids, the compounds of Formula II. In the second step, the novel 6-gem-difluoro steroids, the compounds of Formula IV, are prepared from the corresponding compounds of Formula III by the novel process of the present invention. In the third step, the novel $\Delta^{1,4}$-6-gem-difluoro steroids, the compounds of Formula V, are in turn prepared from the corresponding novel compounds of Formula IV. In the fourth step, the novel 1α,2α-methylene-6-gem-difluoro steroids, the compounds of Formula VI, are prepared from the corresponding novel compounds of Formula V. The novel compounds of Formula I, wherein $R^6$ is the group $$R^{7}\text{—}\overset{H}{\underset{\phantom{.}}{:}}$$

are prepared from the compounds of Formulas IV, V and VI by selectively reducing the 3-keto group of the latter and esterifying or etherifying the resulting 3β-hydroxy compounds as required.

The compounds of Formula III, the 3-enol ethers of the 6-fluoro starting steroids of Formula II, are prepared from the compounds of Formula II by conventional techniques known to the art. For example, the compounds of Formula II are treated with an alkyl orthoformate, preferably methyl orthoformate or ethyl orthoformate, in the presence of an acid catalyst, such as sulfuric acid, p-toluenesulfonic acid, and the like, in an inert nonaqueous, preferably anhydrous, organic solvent to afford the compounds of Formula III.

The compounds of Formula II are then isolated by conventional techniques; for example, the reaction mixture is neutralized with aqueous base and water is added to solidify the enol ether derivatives. The solid is then collected by filtration.

The compounds of Formula III are then treated with perchloryl fluoride in an inert, nonaqueous, preferably anhydrous aprotic organic solvent, as for example, a N,N-dialkyl hydrocarbon carboxylic amide, such as dimethylformamide, dimethylacetamide, and the like, to furnish the novel compounds of Formula IV. The reaction is conducted at temperatures in the range of from about 0° C. to about 100° C., conveniently at room temperature. At least a molar equivalent of perchloryl fluoride is used per molar equivalent of the compound of Formula III, and generally two or more molar equivalents of perchloryl fluoride are utilized.

The novel 6-gem-difluoro steroids, the compounds of Formula IV, are isolated by conventional techniques. For example, the reaction mixture is cautiously neutralized with an aqueous basic solution and the novel product is crystallized by the addition of water. The solid product is collected by filtration. The product can then be purified by dissolving in an inert organic solvent, immiscible with water, as for example, a halogenated hydrocarbon, such as methylchloride, or a water-immiscible ether, such as diethylether; washing with water to neutrality, drying and evaporating to dryness. The product can be further purified by recrystallization, chromatography, and the like. The novel compounds of Formula IV are the novel 6-gem-difluoro steroids of Formula I wherein Z is a carbon-carbon single bond.

The 6-fluoro group of the 6-fluoro starting steroid of Formula II is either in the alpha or beta configuration. The present process is operable with starting steroids possessing either the 6α- or 6β-fluoro configuration.

The $\Delta^1$ unsaturation, the C–1,2 double bond, is introduced into the novel compounds of Formula IV by conventional techniques to furnish the novel $\Delta^{1,4}$ compounds of Formula V. For example, the novel compounds of Formula IV can be refluxed with selenium dioxide in the presence of t-butanol and pyridine, or refluxed with selenium dioxide and chlorobenzene, or refluxed with 2,3-dichloro-5,6-dicyano-1,4-benzoquinone to afford the compounds of Formula V. The compounds of Formula V are the novel 6-gem-difluoro steroids of Formula I, wherein Z is a carbon-carbon double bond.

The compounds of Formula V are isolated by conventional techniques. For example, the reaction mixture may be evaporated to dryness, the residue taken up in an inert organic solvent immiscible with water, washed to neutrality, dried and evaporated to dryness. The compounds can be further purified by recrystallization, chromatography, and the like.

The 1α,2α-methylene group is introduced into the novel compounds of Formula V by conventional techniques to furnish the corresponding novel 1α,2α-methylene compounds of Formula VI. For example, the novel compounds of Formula V are treated with dimethyl sulfoxonium methylide in a solution of dimethylsulfoxide at temperatures of from about 15° C. to about 30° C. The dimethyl sulfoxonium methylide is prepared by reacting trimethyl sulfoxonium chloride or iodide in dimethyl sulfoxide with an alkali metal hydride, such as potassium hydride or sodium hydride under an inert atmosphere.

The compounds of Formula VI are isolated by conventional techniques. For example, the reaction mixture is diluted with water and extracted with an inert organic solvent immiscible with water. The organic extracts are combined, washed with water to neutrality, dried and evaporated. The crude product is then crystallized to remove any $1\beta,2\beta$-methylene isomer that may exist.

The $3\beta$-hydroxy moiety is introduced into the compounds of Formula IV, V and VI by selectively reducing the latter with sodium borohydride in an ether solvent, such as tetrahydrofuran. The $3\beta$-hydroxy group can in turn be esterified or etherified by conventional means. For example, the $3\beta$-hydroxy groups can be esterified with a carboxylic acid anhydride, such as acetic anhydride, in pyridine. The $3\beta$-hydroxy moiety can also be etherified by treatment with dihydropyran or dihydrofuran in the presence of an acid catalyst, such as p-toluenesulfonic acid, in an inert organic solvent such as an ether or hydrocarbon solvent.

The 6-fluoro starting steroids employed in the present process and used to prepare the present novel 6-gem-difluoro steroids are described in the literature and in U.S. and foreign patents. For example, see U.S. Pats. 2,983,737, 2,983,739, 3,053,838, 3,057,858, 3,124,251, 3,126,375 3,201,391 and 3,248,389.

In addition, the 6-fluoro starting steroids can be prepared by conventional techniques well-known to the art from steroids of the following formula:

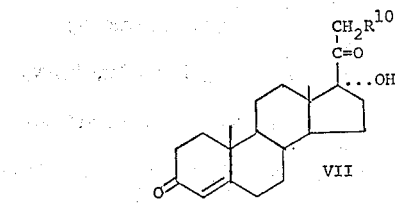

wherein $R^{10}$ is hydrogen or hydroxy.

For example, the 6-fluoro group is introduced by treating a 6-alkoxy-$\Delta^{3,5}$ steroid with perchloryl fluoride in dimethylformamide.

The 16-methyl group is introduced by treating the corresponding 20-keto-$\Delta^{16}$ steroid with methyl magnesium bromide in the presence of cuprous chloride in an ether such as tetrahydrofuran. The 20-keto-$\Delta^{16}$ steroid is prepared by preparing the 3,20-bis-semicarbazone of a 3,20-diketo-17$\alpha$-hydroxy steroid, treating it with glacial acetic acid and acetic anhydride and then allowing the resulting product to react with aqueous pyruvic acid.

A 16-methyl-$\Delta^{16}$ steroid and 16-methylene steroids are prepared by treating the corresponding 20-keto-$\Delta^{16}$ steroid with diazomethane and then pyrolyzing the resulting product to yield the mixture of the 16-methylene steroid and the 16-methyl-$\Delta^{16}$ steroid. The two products are separated by conventional methods such as crystallization or chromatography.

The 17$\alpha$-hydroxy group is introduced in conjunction with the 16-methyl group by first treating the corresponding 16-methyl-$\Delta^{16}$ steroid with hydrogen peroxide, in an aqueous basic media, then permitting the resulting 16,17-oxido-16-methyl steroid to react with hydrogen bromide in glacial acetic acid to yield the corresponding 16-methylene-17-hydroxy steroid which is hydrogenated with the use of a palladium catalyst to afford the corresponding 16-methyl-17$\alpha$-hydroxy derivative. Alternative methods for preparing the 16-methylene steroids are disclosed in U.S. Pat. 3,168,537.

The 16$\alpha$,17$\alpha$-dihydroxy groups are introduced by treating a $\Delta^{16}$ steroid derivative with potassium permanganate, acetone and acetic acid. The 16$\alpha$,17$\alpha$-acetal or ketal groups are introduced by treating the corresponding 16$\alpha$,17$\alpha$-dihydroxy steroid in presence of perchloric acid with a lower alkanal, such as paraldehyde, propanol, and hexanal; halogenated lower alkanal, such as chloral hydrate, trifluoroacetaldehyde hemiacetal and haptafluorobutanal ethyl hemiacetal; a di(lower alkyl) ketone, such as acetone, diethylketone, dibutylketone, methylethylketone, and methylisobutylketone; a halogenated di(lower alkyl) ketone, such as 1,1,1-trifluoroacetone; a cycloalkanone, such as cyclopentanone, cyclohexanone, cyclobutanone, and cyclodexanone; mono and dicycloalkyl ketone, such as cyclohexylmethyl ketone and dicyclopropyl ketone; a monocyclic aromatic aldehyde, such as benzaldehyde, halobenzaldehydes (e.g. p-chlorobenzaldehyde and p-fluorobenzaldehyde), lower alkoxy benzaldehydes (e.g. o-anisaldehyde), di(lower alkoxy)benzaldehydes (e.g. veratraldehyde), hydroxybenzaldehydes (e.g. salicylaldehyde), dihydroxy benzaldehydes (e.g. resorcylaldehyde), lower alkyl benzaldehydes (e.g. m-tolualdehyde and p-ethylbenzaldehyde), di(lower alkyl) benzaldehydes (e.g. o,p-dimethylbenzaldehyde), acylamidobenzaldehydes (e.g. N-acetylanthranilaldehyde), monocyclic aromatic lower alkanals, such as phenylacetaldehyde, $\alpha$-phenylpropionaldehyde, $\beta$-phenylpropionaldehyde, $\gamma$-phenylbutyraldehyde, and aromatically-substituted halo, lower alkoxy, hydroxy, lower alkyl, acylamido and derivatives thereof; monocyclic heterocyclic aldehydes, such as picolinaldehydes, furfural, thiophene carbonals and halo, lower alkoxy, hydroxy, and lower alkyl derivatives thereof; a monocyclic heterocyclic lower alkanal such as oxacyclopen-4-yl acetaldehyde; a monocyclic aromatic lower alkyl ketone, such as acetophenone, propiophenone, butyrophenone, valerophenone, isocaprophenone, halophenyl lower alkyl ketones (e.g. p-chloroacetophenon, p-fluoroacetophenone, p-chloropropiophenone and p-fluoropropiophenone), (lower alkoxy) phenyl lower alkyl ketones (e.g. p-anisyl methyl ketone), di(lower alkoxy) phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl) phenyl lower alkyl ketones (o,p-xylyl methyl ketone), and acylamidophenyl lower alkyl ketones (e.g. acetylanilines), benzophenone, and mono or bis substituted fluoro or chloro, lower alkoxy, hydroxy, lower alkyl, acylamido derivatives thereof; a monocyclic aromatic lower alkanone, such as 1-phenyl-3-butanone and 1-phenyl-4-pentanone, and aromatically substituted derivatives thereof; monocyclic heterocyclic ketones, such as 2-acetylfuran, 2-benzoyl furan, and 2-acetylthiophene; monocyclic heterocyclic lower alkanones; and monocyclic heterocyclic ketones, such as alloxan; and oxo(lower)alkanoic acids such as glyoxylic acid, pyruvic acid, acetoacetic acid $\beta$-keto propionic acid $\alpha$-keto butyric acid, lavulinic acid, and $\beta$-keto caproic acid and $\beta$-keto caprylic acid (as well as salts and esters thereof, such as lower alkyl esters, e.g. methyl and ethyl).

The 21-chloro group is introduced by treating the 21-hydroxy steroid derivative with a molar equivalent of triphenyl phosphine in carbon tetrachloride, optionally in the presence of dimethylformamide or dimethylacetamide, at about room temperature.

The 21-fluoro group is introduced by tosylating a 21-hydroxy steroid derivative with tolylsulfonyl chloride in pyridine, then refluxing the resulting 21-tolylsulfonate ester with sodium iodide in acetone to get the corresponding 21-iodo steroid derivative; and lastly refluxing the latter with potassium fluoride in ethylene glycol.

The 17$\alpha$-hydroxy groups are etherified and esterified by conventional methods well-known to the art. For example, a 17$\alpha$-hydroxy steroid is etherified by treating it with sodium hydride and then allowing it to react with an alkyl halide, or the like, and a 17$\alpha$-hydroxy steroid is esterified by treating it with an acid anhydride in pyridine.

The unsaturation of C–5,6 is introduced by treating the corresponding 3-keto-$\Delta^4$ compound with chloranil in a mixture of ethyl acetate and acetic acid or xylene under nitrogen while refluxing. The mixture is heated at reflux for a period of from 20 hours to 100 hours. After the reaction is over, the reaction mixture is allowed to cool and then is washed with cold, aqueous alkali metal hydroxide solutions.

The following examples are intended to further illustrate and typify the nature of this invention. These examples are presented solely for the purpose of exemplification, and they should not be construed as a limitation on the scope of the invention.

EXAMPLE 1

Part A.—To a suspension of 1 g. of 6α-fluoro-16α,17α-isopropylidenedioxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is then added 0.8 ml. of pyridine, followed by water until solidification occurs. This solid is collected by filtration, washed with water and air dried to yield 3-ethoxy-6-fluoro-16α,17α-isopropylidenedioxypregna-3,5-dien-20-one, which is recrystallized from acetone:hexane.

Part B.—A stream of perchloryl fluoride is passed through a solution of 1 g. of 3-ethoxy-6-fluoro-16α,17α-isopropylidenedioxypregna-3,5-dien-20-one in 25 ml. of dimethylformamide, cooled to 20° C., for 95 minutes. After being allowed to slowly attain a temperature of 25° C., the solution is poured into water and extracted with ethyl acetate. These extracts are washed with saturated aqueous sodium bicarbonate solution and with water to neutrality, dried over sodium sulfate and evaporated to dryness to yield 6α,6β-difluoro-16α,17α-isopropylidenedioxypregn-4-ene-3,20-dione, which is recrystallized from acetone:hexane.

Similarly, 6α,6β -difluoro-16α,17α-isopropylidenedioxypregn-4-ene-3,20-dione is obtained when 6β-fluoro-16α, 17α - isopropylidenedioxypregn-4-ene-3,20-dione is employed in the above process of Example 1 as the 6-fluoro starting steroid.

Part C.—A mixture of 1 g. of 6α,6β-difluoro-16α,17α-isopropylidenedioxypregn-4-ene-3,20-dione, 50 ml. of t-butanol, 0.4 g. of recently sublimed selenium dioxide and 0.2 ml. of pyridine is refluxed under nitrogen for 48 hours, cooled and filtered through Celite diatomaceous earth. The filtrate is evaporated under reduced pressure and the residue dissolved in acetone. This solution is refluxed in the presence of charcoal for 1 hour, filtered through Celite diatomaceous earth and evaporated. The residue is then chromatographed on neutral alumina to yield 6α,6β - difluoro-16α,17α-isopropylidenedioxypregna-1,4-diene-3,20-dione.

By the method of the processes of Parts A and B

6α,6β,21-trifluoro-16α,17α-cyclohexylidenedioxypregn-4-ene-20-dione;
6α,6β-difluoro-16α,17α-isopropylidenedioxy-21-chloropregn-4-ene-3,20-dione;
6α,6β,21-trifluoro-16α,17α-(4',4'-tetrahydropyranylidene-dioxy)pregn-4-ene-3,20-dione;
6α,6β-difluoro-16α,17α-(3',3'-tetrahydrofuranylidene-dioxy)-21-chloropregn-4-ene-3,20-dione;
6α,6β-difluoro-21-chloro-16α,17α-(4',4'-pyridylidene-dioxy)pregn-4-ene-3,20-dione;
6α,6β,21-trifluoro-16α,17α-(3',3'-hexylidenedioxy)pregn-4-ene-3,20-dione;
6α,6β-difluoro-21-chloro-16α,17α-cyclopentylidenedioxy-pregn-4-ene-3,20-dione;
6α,6β,21-trifluoro-16α,17α-(3',3'-pentylidenedioxy)pregn-4-ene-3,20-dione;
6α,6β-difluoro-21-chloro-16α,17α-(2,2-butylidenedioxy)pregn-4-ene-3,20-dione;
6α,6β-difluoro-16α,17α-isopropylidenedioxy-19-norpregn-4-ene-3,20-dione;
6α,6β-difluoro-16α,17α-(1'-phenyl-1'-methylmethylene-dioxy)pregn-4-ene-3,20-dione;
6α,6β-difluoro-16α,17α-(1'-phenyl-1'-methylmethylene-dioxy)-19-norpregn-4-ene-3,20-dione;
6α,6β-difluoro-16α,17α-cyclopentylidenedioxy-19-norpregn-4-ene-3,20-dione;
6α,6β-difluoro-16α,17α-(2',2'-pentylidenedioxy)-19-norpregn-4-ene-3,20-dione;
6α,6β-difluoro-16α,17α-(1'-thia-1'-oxide-4',4'-cyclohexylidene)-19-norpregn-4-ene-3,20-dione;
6α,6β-difluoro-16α,17α-(1'-thia-dioxide-4',4'-cyclohexylidenedioxy)pregn-4-ene-3,20-dione; and
6α,6β-difluoro-16α,17α-(4',4'-pyridylidenedioxy)pregn-4-ene-3,20-dione, are prepared from the corresponding 6α- or 6β-fluoro steroids.

By employing the above novel Δ⁴-6-gem-difluoro compounds as starting materials in the process of Part C, the following novel Δ¹,⁴-6-gem-difluoro steroids are respectively prepared:

6α,6β,21-trifluoro-16α,17α-cyclohexylidenedioxypregna-1,4-diene-3,20-dione;
6α,6β-difluoro-16α,17α-isopropylidenedioxy-21-chloropregna-1,4-diene-3,20-dione;
6α,6β,21-trifluoro-16α,17α-(4',4'-tetrahydropyranylidene-dioxy)pregna-1,4-diene-3,20-dione;
6α,6β-difluoro-16α,17α-(3',3'-tetrahydrofuranylidene-dioxy)-21-chloropregna-1,4-diene-3,20-dione;
6α,6β-difluoro-21-chloro-16α,17α-(4',4'-pyridylidene-dioxy)pregna-1,4-diene-3,20-dione;
6α,6β,21-trifluoro-16α,17α-(3',3'-hexylidenedioxy)pregna-1,4-diene-3,20-dione;
6α,6β-difluoro-21-chloro-16α,17α-cyclopentylidenedioxypregna-1,4-diene-3,20-dione;
6α,6β,21-trifluoro-16α,17α-(3',3'-pentylidenedioxy)pregna-1,4-diene-3,20-dione;
6α,6β-difluoro-21-chloro-16α,17α-(2,2-butylidenedioxy)pregna-1,4-diene-3,20-dione;
6α,6β-difluoro-16α,17α-(1'-phenyl-1'-methylmethylene-dioxy)pregna-1,4-diene-3,20-dione;
6α,6β-difluoro-16α,17α-(1'-thia-4',4'-cyclohexylidenedioxy dioxide)pregna-1,4-diene-3,20-dione; and
6α,6β-difluoro-16α,17α-(4',4'-pyridylidenedioxy)pregna-1,4-diene-3,20-dione are obtained.

EXAMPLE 2

The following 3-keto-Δ¹,⁴-6-gem-difluoro steroids are prepared from the corresponding 3-keto-Δ⁴-6α- and/or 6β-fluoro steroids by employing the latter as starting materials in the process of Part A of Example 1, and subsequently employing the resulting 3-ethoxy-Δ³,⁵ steroids as starting materials in the process of Part B of Example 1 and then subsequently employing the resulting 3-keto-Δ⁴-6-gem difluoro steroids as starting materials in the process of Part C of Example 1

6α,6β-difluoro-16α,17α-(3',3'-pentylidenedioxy)-21-chloropregna-1,4-diene-3,20-dione;
6α,6β-difluoro-16α,17α-(diphenylmethylenedioxy)-21-chloropregna-1,4-diene-3,20-dione;
6α,6β-difluoro-21-chloro-16α,17α-(cyclohexylidenedioxy)pregna-1,4-diene-3,20-dione;
6α,6β,21-trifluoro-16α,17α-(dicyclopentylmethylenedioxy)pregna-1,4-diene-3,20-dione;
6α,6β,21-trifluoro-16α,17α-cyclopentylidenedioxypregna-1,4-diene-3,20-dione;
6α,6β-difluoro-16α,17α-(1'-thia-4',4'-cyclohexylidene-dioxy-21-chloropregna-1,4-diene-3,20-dione;
6α,6β-difluoro-16α,17α-(N-methyl-4',4'-piperidylidene-dioxy)-21-chloropregna-1,4-diene-3,20-dione;
6α,6β,21-trifluoro-16α,17α-(4',4'-piperidylidenedioxy)pregna-1,4-diene-3,20-dione;
6α,6β-difluoro-16α,17α-(1'-thia-4',4'-cyclohexylidene-dioxy)-21-chloropregna-1,4-diene-3,20-dione;
6α,6β-difluoro-16α,17α-(1'-methyl-1'-phenylmethylene-dioxy)-21-chloropregna-1,4-diene-3,20-dione;
6α,6β,21-trifluoro-16α,17α-(1'-phenyl-1'-methylmethyl-enedioxy)pregna-1,4-diene-3,20-dione;

6α,6β-difluoro-16α,17α-(1'-ethyl-1'-phenylmethylenedioxy)-21-chloropregna-1,4-diene-3,20-dione;
6α,6β-difluoro-16α,17α-(cyclohexylidenedioxy)pregna-1,4-diene-3,20-dione;
6α,6β-difluoro-16α,17α-(N-methyl-4',4'-piperidylidenedioxy)pregna-1,4-diene-3,20-dione;
6α,6β-difluoro-16α,17α-(4',4'-tetrahydropyranylidenedioxy)pregna-1,4-diene-3,20-dione;
6α,6β-difluoro-3',3'-tetrahydrofuranylylidenedioxy)pregna-1,4-diene-3,20-dione;
6α,6β-difluoro-16α,17α-(3',3'-pentylidenedioxy)pregna-1,4-diene-3,20-dione;
6α,6β-difluoro-16α,17α-(4',4'-tetrahydropyranylidenedioxy)-21-chloropregna-1,4-diene-3,20-dione;
6α,6β,21-trifluoro-16α,17α-(2',2'-hexylidenedioxy)pregna-1,4-diene-3,20-dione; and
6α,6β,21-trifluoro-16α,17α-(2'-thia-3',3'-cyclohexylidenedioxy dioxide)pregna-1,4-diene-3,20-dione.

EXAMPLE 3

Part A.—To a suspension of 1 g. of 6α-fluoro-16α-methylpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air-dried to yield 3-ethoxy-6-fluoro-16α-methylpregna-3,5-dien-20-one, which is recrystallized from acetone:hexane.

Part B.—A stream of perchloryl fluoride is passed through a solution of 1 g. of 3-ethoxy-6-fluoro-16α-methylpregna-3,5-dien-20-one in 25 ml. of dimethylformamide, cooled to 0° C., for 5 minutes. After being allowed to slowly attain a temperature of 20° C., the solution is poured into water and extracted with ethyl acetate. These extracts are washed with a saturated aqueous sodium bicarbonate solution and then with water to neutrality, dried over sodium sulfate and evaporated to dryness to yield 6α,6β-difluoro-16α-methylpregn-4-ene-3,20-dione, which is recrystallized from acetone:hexane.

Part C.—A mixture of 0.5 g. of 6α,6β-difluoro-16α-methylpregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is filtered through 10 g. of alumina and concentrated to yield 6α,6β-difluoro-16α-methylpregna-1,4-diene-3,20-dione.

Similarly, the following novel Δ$^{1,4}$-6-gem-difluoro steroids are prepared from the corresponding Δ$^4$-6-difluoro steroids by means of the above described process:

6α,6β-difluoro-17-hydroxy-16β-methyl-21-chloropregna-1,4-diene-3,20-dione;
6α,6β-difluoro-16α-methyl-17α-hydroxypregna-1,4-diene-3,20-dione;
6α,6β-difluoro-16α-methyl-17α-acetoxypregna-1,4-diene-3,20-dione;
6α,6β,21-trifluoro-17α-hydroxy-16α-methylpregna-1,4-diene-3,20-dione;
6α,6β-difluoro-16α-methyl-17α-valeryloxypregna-1,4-diene-3,20-dione;
6α,6β-difluoro-17α-hydroxy-21-chloropregna-1,4-diene-3,20-dione;
6α,6β,21-trifluoro-17α-hydroxypregna-1,4-diene-3,20-dione
6α,6β,21-trifluoropregna-1,4-diene-3,20-dione;
6α,6β-difluoro-21-chloropregna-1,4-diene-3,20-dione;
6α,6β-difluoro-16α-methyl-17α-valeryloxy-21-chloropregna-1,4-diene-3,20-dione;
6α,6β,21-trifluoro-16α-methyl-17α-valeryloxypregna-1,4-diene-3,20-dione;
6α,6β,21-trifluoro-16-methylene-17α-hydroxypregna-1,4-diene-3,20-dione;
6α,6β-difluoro-16-methylene-17α-butyryloxy-21-chloropregna-1,4-diene-3,20-dione;
6α,6β,21-trifluoro-16-methylene-17α-valeryloxypregna-1,4-diene-3,20-dione;
6α,6β-difluoro-16-methylene-17α-hydroxy-21-chloropregna-1,4-diene-3,20-dione;
6α,6β-difluoro-16-methylene-21-chloropregna-1,4-diene-3,20-dione;
6α,6β-difluoro-16α-methyl-17α-hydroxypregna-1,4-diene-3,20-dione;
6α,6β-difluoro-16-methylenepregna-1,4-diene-3,20-dione;
6α,6β-difluoro-16α,17α-dihydroxypregna-1,4-diene-3,20-dione;
6α,6β-difluoro-16-methylene-17α-hydroxypregna-1,4-diene-3,20-dione;
6α,6β-difluoro-16-methylene-17α-valeryloxypregna-1,4-diene-3,20-dione;
6α,6β-difluoro-17α-propionyloxypregna-1,4-diene-3,20-dione;
6α,6β-difluoro-16α-methylpregna-1,4-diene-3,20-dione;
6α,6β-difluoro-16-methylene-17α-acetoxypregna-1,4-diene-3,20-dione;
6α,6β-difluoro-16-methylene-17α-diethylaminoacetoxypregna-1,4-diene-3,20-dione;
6α,6β-difluoro-16-methylene-17α-β-chlorobutyryloxypregna-1,4-diene-3,20-dione;
6α,6β-difluoro-17α-acetoxypregna-1,4-diene-3,20-dione;
6α,6β-difluoro-16β-methylpregna-1,4-diene-3,20-dione;
6α,6β,21-trifluoro-16-methylenepregna-1,4-diene-3,20-dione; and
6α,6β-difluoro-16-methylene-17α-cyclopentylpropionate-21-chloropregna-1,4-diene-3,20-dione.

EXAMPLE 4

The following 3-keto-Δ$^4$-6-gem-difluoro steroids are prepared from the corresponding 3-keto-Δ$^4$-6α, and/or 6β-fluoro steroids by employing the latter as starting materials in the process of Example 3 and subsequently employing the resulting 3-ethoxy-Δ$^{3,5}$ steroids as starting materials in the process of Part B of Example 3:

6α,6β-difluoro-16-methylene-17α-hydroxy-19-norpregn-4-ene-3,20-dione;
6α,6β-difluoro-16-methylene-17α-hydroxypregn-4-ene-3,20-dione;
6α,6β-difluoro-16-methylene-17α-valeryloxy-19-norpregn-4-ene-3,20-dione;
6α,6β-difluoro-16-methylene-17α-valeryloxypregn-4-ene-3,20-dione;
6α,6β-difluoro-17α-hydroxy-19-norpregn-4-ene-3,20-dione;
6α,6β-difluoro-17α-acetoxypregn-4-ene-3,20-dione;
6α,6β-difluoro-16β-methyl-19-norpregn-4-ene-3,20-dione;
6α,6β-difluoro-16α-methylpregn-4-ene-3,20-dione;
6α,6β-difluoro-16β-methylpregna-1,4-diene-3,20-dione;
6α,6β-difluoro-16α-methyl-17α-valeryloxy-19-norpregn-4-ene-3,20-dione;
6α,6β,21-trifluoro-16-methylenepregn-4-ene-3,20-dione;
6α,6β-difluoro-16-methylene-17α-hydroxy-21-chloropregn-4-ene-3,20-dione;
6α,6β-difluoro-16-methylene-19-norpregn-4-ene-3,20-dione;
6α,6β-difluoro-16-methylene-4-ene-3,20-dione;
6α,6β-difluoro-16α,17α-dihydroxypregn-4-ene-3,20-dione;
6α,6β,21-trifluoro-17α-hydroxypregn-4-ene-3,20-dione;
6α,6β-difluoro-17α-phenylacetoxypregn-4-ene-3,20-dione;
6α,6β,21-trifluoro-16β-methyl-17α-trimethylhexanoate-19-norpregn-4-ene-3,20-dione;
6α,6β-difluoro-16α-methyl-17α-hemisuccinoyloxy-21-chloro-19-norpregn-4-ene-3,20-dione; and
6α,6β-difluoro-16-methyl-17α-adamantoyloxy-21-chloropregn-4-ene-3,20-dione.

EXAMPLE 5

3.6 grams of 6α,6β-difluoro - 17α - hydroxypregna-1,4-diene-3,20-dione is added to a solution of 25 mmoles of dimethylsulfoxonium methylide and 50 ml. of dimethylsulfoxide and the mixture stirred at room temperature for 22 hours under nitrogen. The reaction mixture is diluted with water and the resulting precipitate filtered. The solid material is taken up in ether-ethyl acetate and washed with water, dried over magnesium sulfate and the solvent evaporated to give 4.5 grams of material. The material is chromatographed on neutral alumina eluting with benzene and benzene:chloroform 4:1 to give 1α,2α-methylene-6α,6β-difluoro - 17α - hydroxypregn-4-ene-3,20-dione.

In a similar manner the 1α,2α-methylene moiety can be introduced into the novel 6α,6β-difluoro-Δ$^{1,4}$-steroids prepared in Examples 1–3. For example the following novel 1α,2α-methylene - 6α,6β - difluoro steroids are prepared from the corresponding Δ$^1$-6α,6β-difluoro steroids by means of the above described process:

1α,2α-methylene - 6α6β - difluoro - 16 - methylene-17α-hydroxypregn-4-ene-3,20-dione;
1α,2α-methylene - 6α,6β - difluoro - 17α - acetoxypregn-4-ene-3,20-dione;
1α,2α-methylene - 6α,6β - difluoro - 16 - methylene-17α-valeryloxypregn-4-ene-3,20-dione;
1α,2α-methylene - 6α,6β - difluoro - 16α,17α - isopropylidenedioxypregn-4-ene-3,20-dione;
1α,2α-methylene - 6α,6β - difluoro - 16α,17α - (1'-methyl-1'-phenylmethylenedioxy)pregn-4-ene-3,20-dione;
1α,2α-methylene - 6α,6β,21 - trifluoro - 16α - methyl-17α-hydroxypregn-4-ene-3,20-dione;
1α,2α-methylene-6α,6β,21-trifluoro-16β-methyl-17α caproyloxypregn-4-ene-3,20-dione;
1α,2α-methylene-6α,6β-difluoro-16α-methyl-21-chloropregn-4-ene-3,20-dione;
1α,2α-methylene-6α,6β,21-trifluoro-16-methylenepregn-4-ene-3,20-dione;
1α,2α-methylene-6α,6β-difluoro-17α-hydroxy-21-chloropregn-4-ene-3,20-dione;
1α,2α-methylene-6α,6β-difluoro-16α,17α-cyclopentylidenedioxypregn-4-ene-3,20-dione;
1α,2α-methylene-6α,6β-difluoro-16α-methyl-17α-hydroxypregn-4-ene-3,20-dione;
1α,2α-methylene-6α,6β-difluoro-16β-methyl-17α-acetoxypregn-4-ene-3,20-dione;
1α,2α-methylene-6α,6β-difluoropregn-4-ene-3,20-dione;
1α,2α-methylene-6α,6β-difluoro-16α-methyl-17α-valeryloxypregn-4-ene-3,20-dione;
1α,2α-methylene-6α,6β-difluoro-16α,17α-(pyridylidenedioxy)pregn-4-ene-3,20-dione;
1α,2α-methylene-6α,6β-difluoro-16α,17α-(4',4'-tetrahydrofuranylidenedioxy)pregn-4-ene-3,20-dione;
1α,2α-methylene-6α,6β-difluoro-16-methylenepregn-4-ene-3,20-dione;
1α,2α-methylene-6α,6β-difluoro-16α-acetoxypregn-4-ene-3,20-dione;
1α,2α-methylene-6α,6β-difluoro-16α,17α-dihydroxypregn-4-ene-3,20-dione;
1α,2α-methylene-6α,6β-difluoro-16-methylene-17α-acetoxypregn-4-ene-3,20-dione; and
1α,2α-methylene-6α,6β-difluoro-17α-valeryloxypregn-4-ene-3,20-dione.

EXAMPLE 6

A solution of 1 g. of 6α,6β-difluoro-16α-methyl-17α-hydroxy-19-norpregn-4-ene-3,20-dione in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β,17α-dihydroxy-6α,6β-difluoro-16α-methyl - 19 - norpregn-4-en-20-one which may be further purified through recrystallization from acetone:hexane.

In a similar manner the novel 6-gem-difluoro steroids of Examples 1–5 can be selectively reduced to yield the corresponding 3β-hydroxy-6-gem-difluoro steroids. For example, 3β-hydroxy-6α,6β-difluoro-16α,17α-isopropylidenedioxypregna-1,4-dien-20-one;
1α,2α-methylene-3β-hydroxy-6α,6β-difluoro-16-methylene-17α-valeryloxypregn-4-en-20-one;
1α,2α-methylene-3β-hydroxy-6α,6β-difluoro-16β-methyl-17α-acetoxy-21-chloropregn-4-en-20-one; and
1α,2α-methylene-3β-hydroxy-6α,6β,21-trifluoro-16α,17α-(1'-phenyl-1'-methylmethylenedioxy)pregn-4-en-20-one are prepared respectively from
6α,6β-difluoro-16α,17α-isopropylidenedioxypregna-1,4-diene-3,20-dione;
1α,2α-methylene-6α,6β-difluoro-16-methylene-17α-valeroxypregn-4-ene-3,20-dione;
1α,2α-methylene-6α-6β-difluoro-16β-methyl-17α-acetoxy-21-chloropregn-4-ene-3,20-dione; and
1α,2α-methylene-6α,6β,21-trifluoro-16α,17α-(1'-phenyl-1'-methylmethylenedioxy)pregn-4-ene-3,20-dione.

EXAMPLE 7

Two milliliters of dihydropyran are added to a solution of 1 g. of 3β,17α-dihydroxy-6α,6β-difluoro-16-methylene-19-norpregn-4-ene-3,20-dione in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydropyran-2'-yloxy - 6α,6β - difluoro-16α-methyl-17α-hydroxy-19-norpregn-4-ene-3,20-dione which is recrystallized from pentane.

Similarly, by employing dihydrofuran in place of dihydropyran in the above procedure, 3β-tetrahydrofuran-2'-yloxy-6α,6β-difluoro-16α-methyl - 17α - hydroxy-19-norpregn-4-ene-3,20-dione is obtained.

By means of the above process

1α,2α-methylene-3β-tetrahydropyran-2'-yloxy-6α,6β-difluoro-16α,17α-cyclohexylidene-21-chloropregn-4-en-20-one;
3β-tetrahydropyran-2'-yloxy-6α,6β-difluoro-16α-methyl-17α-caproyloxypregna-1,4-dien-20-one;
1α,2α-methylene-3β-tetrahydropyran-2'-yloxy-6α,6β,21-trifluoro-16-methylene-17α-hydroxypregn-4-en-20-one; and
3β-tetrahydropyran-2'-yloxy-6α,6β-difluoro-17α-acetoxypregn-4-en-20-one are respectively prepared from
1α,2α-methylene-3β-hydroxy-6α,6β-difluoro-16α,17α-cyclohexylidenedioxy-21-chloropregn-4-en-20-one;
3β-hydroxy-6α,6β-difluoro-16α-methyl-17α-caproyloxypregna-1,4-diene-20-one;
1α,2α-methylene-6α,6β,21-trifluoro-16-methylene-17α-hydroxypregn-4-en-20-one; and
3β-hydroxy-6α,6β-difluoro-17α-acetoxypregn-4-en-20-one.

EXAMPLE 8

A mixture of 1 g. of 3β,17α-dihydroxy-6α,6β-difluoro-16α-methyl-19-norpregn-20-one, 4 ml. of pyridine, and 2 ml. of acetic anhydride is allowed to stand at room temperature for 15 hours. The mixture is then poured into ice water and the solid which forms is collected by filtration, washed with water and dried to yield 3β-acetoxy-6α,6β-difluoro-16α-methyl-17α-hydroxy - 19 - norpregn-4-en-20-one which may be further purified through recrystallization from acetone:hexane.

13

Similarly, by employing propionyl anhydride, valeryl anhydride and caproyl anhydride in place of acetic anhydride in the above procedure the following compounds are respectively obtained:

3β-propionyloxy-6α,6β-difluoro-16α-methyl-17α-hydroxy-19-norpregn-4-en-20-one;
3β-valeryloxy-6α,6β-difluoro-16α-methyl-17α-hydroxy-19-norpregn-4-en-20-one; and
3β-caproyloxy-6α,6β-difluoro-16α-methyl-17α-hydroxy-19-norpregn-4-en-20-one.

By means of the above described process, the 3β-hydroxy steroids prepared in Example 6 can be similarly esterified. For example, 1α,2α-methylene-3β-acetoxy-6α,6β-difluoro-16-methylene-17α-valeryloxypregn-4-en-20-one is prepared from
1α,2α-methylene-3β-hydroxy-6α,6β-difluoro-16-methylene-17α-valeryloxypregn-4-en-20-one by means of the above process.

EXAMPLE 9

By means of the processes described in Part A and Part B of Example 3,

6α,6β-difluoro-16α-methyl-17α-acetoxypregn-4-ene-3,20-dione,
6α,6β-difluoro-16α-methyl-17α-hydroxy-19-norpregn-4-ene-3,20-dione,
6α,6β-difluoro-16α-methyl-17α-acetoxy-19-norpregn-4-ene-3,20-dione,
6α,6β-difluoro-16α-methylpregn-4-ene-3,20-dione,
6α,6β-difluoro-16α-methyl-17α-valeryloxy-21-chloropregn-4-ene-3,20-dione, and
6α,6β-difluoro-16α-methyl-17α-valeryloxypregn-4-ene-3,20-dione are respectively prepared from 6α-fluoro-16α-methyl-17α-acetoxypregn-4-ene-3,20-dione,
6α-fluoro-16α-methyl-17α-hydroxy-19-norpregn-4-ene-3,20-dione,
6α-fluoro-16α-methyl-17α-acetoxy-19-norpregn-4-ene-3,20-dione,
6α-fluoro-16α-methylpregn-4-ene-3,20-dione,
6α-fluoro-16α-methyl-17α-valeryloxy-21-chloropregn-4-ene-3,20-dione and
6α-fluoro-16α-methyl-17α-valeryloxypregn-4-ene-3,20-dione.

What is claimed is:
1. The compounds of the formula wherein $R^1$ is hydrogen, fluoro or chloro;
$R^2$ is hydrogen, hydroxy or a conventional hydrolyzable ester;
$R^3$ is hydrogen, hydroxy, methyl, or methylene; provided $R^3$ is methyl, or methylene when $R^1$ is hydrogen, $R^2$ is hydrogen, hydroxy or a conventional hydrolyzable ester and Z is a carbon-carbon single bond or a carbon-carbon double bond;
$R^2$ and $R^3$ taken together are the group each of $R^4$ and $R^5$, independently of each other, is hydrogen, lower alkyl, halogenated lower alkyl, monocyclic cycloalkyl, monocyclic cycloalkyl lower alkyl, monocyclic aryl, monocyclic aryl lower alkyl, monocyclic heterocyclic, monocyclic heterocyclic lower alkyl; or $R^4$ and $R^5$ together with the carbon atoms to which they are joined are monocyclic cycloalkylidene or monocyclic heterocyclic ylidene;
$R^6$ is O= or the group
$R^7$ is hydroxy, conventional hydrolyzable ester, tetrahydrofuran-2′-yloxy or tetrahydropyran-2′-yloxy;
$R^8$ is hydrogen or methyl;
Z is a carbon-carbon single bond, a carbon-carbon double bond or a 1α,2α-methylene group; provided Z is a 1α,2α-methylene group when $R^1$ is fluoro or chloro; or when $R^1$ is hydrogen and $R^2$ and $R^3$ are taken together; and provided $R^8$ is methyl when Z is a carbon-carbon double bond or methylene.

2. The compounds according to claim 1 wherein $R^2$ is hydrogen, hydroxy, acetoxy or valeryloxy; and each of $R^4$ and $R^5$ is, independently of each other, methyl, ethyl, propyl, butyl or phenyl; or $R^4$ and $R^5$ taken together with the carbon atoms to which they are joined are cyclopentylidene, cyclohexylidene, 4′,4′-tetrahydropyranylidene, 4′,4′-piperidylidene, N-methyl-4′,4′-piperidylidene, N-ethyl4′,4′-piperidylidene, 1′-thia-4′,4′-cyclohexylidene, 1′-thia-4′,4′-cyclohexylidene oxide or 1′-thia-4′,4′-cyclohexylidene dioxide.

3. The compound according to claim 2 which is 6α,6β-difluoro-16-methylene-17α-hydroxy-19-norpregn-4-ene-3,20-dione.

4. A compound according to claim 2 which is 6α,6β-difluoro-16-methylene-17α-hydroxypregn-4-ene-3,20-dione.

5. The compound according to claim 2 which is 6α,6β-difluoro-16-methylene-17α-hydroxypregna-1,4-diene-3,20-dione.

6. The compound according to claim 2 which is 6α,6β-difluoro-17α-hydroxy-1α,2α-methylenepregn-4-ene-3,20-dione.

7. The compound according to claim 2 which is 1α,2α-methylene-6α,6β-difluoro-16-methylene-17α-hydroxypregn-4-ene-3,20-dione.

8. The compounds according to claim 2 which are the acetate and valerate esters of 6α,6β-difluoro-16-methylene-17α-hydroxy-19-norpregn-4-ene-3,20-dione.

9. The compounds according to claim 2 which are the acetate and valerate esters of 6α,6β-difluoro-16-methylene-17α-hydroxypregn-4-ene-3,20-dione.

10. The compounds according to claim 2 which are the acetate and valerate esters of 6α,6β-difluoro-16-methylene-17α-hydroxypregna-1,4-diene-3,20-dione.

11. The compounds according to claim 2 which are the acetate and valerate esters of 1α,2α-methylene-6α,6β-difluoro-17α-hydroxypregn-4-ene-3,20-dione.

12. The compounds according to claim 2 which are the acetate and valerate esters of 1α,2α-methylene-6α,6β-difluoro-16-methylene-17α-hydroxypregn-4-ene-3,20-dione.

13. The compound according to claim 2 which is 6α,6β-difluoro-16α-methyl-17α-hydroxy-19-norpregn-4-ene-3,20-dione.

14. The compound according to claim 2 which is 6α,6β-difluoro-16α-methyl-17α-hydroxypregn-4-ene-3,20-dione.

15. The compound according to claim 2 which is 6α,6β-difluoro-16α-methyl-17α-hydroxypregna-1,4-diene-3,20-dione.

16. The compound according to claim 2 which is 1α,2α-methylene-6α,6β-difluoro-16α-methyl-17α-hydroxypregn-4-ene-3,20-dione.

17. The compounds according to claim 2 which are the acetate and valerate esters of 6α,6β-difluoro-16α-methyl-17α-hydroxy-19-norpregn-4-ene-3,20-dione.

18. The compounds according to claim 2 which are the acetate and valerate esters of 6α,6β-difluoro-16α-methyl-17α-hydroxypregn-4-ene-3,20-dione.

19. The compounds according to claim 2 which are the acetate and valerate esters of 6α,6β-difluoro-16α-methyl-17α-hydroxypregna-1,4-diene-3,20-dione.

20. The compounds according to claim 2 which are the acetate and valerate esters of 1α,2α-methylene-6α,6β-difluoro-16α-methyl-17α-hydroxypregn-4-ene-3,20-dione.

21. The compound according to claim 2 which is 1α,2α-methylene-6α,6β-difluoro - 16α,17α - isopropylidenedioxypregn-4-ene-3,20-dione.

22. The compound according to claim 2 which is 1α,2α-methylene-6α,6β-difluoro - 16α,17α - (1'-methyl-1'-phenylmethylenedioxy)pregn-4-ene-3,20-dione.

23. The compound according to claim 2 which is 6α,6β-difluoro-16α-methylpregn-4-ene-3,20-dione.

24. The compound according to claim 2 which is 6α,6β-difluoro-16α-methylpregna-1,4-diene-3,20-dione.

References Cited

UNITED STATES PATENTS 3,471,477   10/1969   Fried _____ 260—239.5

ELBERT L. ROBERTS, Primary Examiner

U.S. Cl. X.R.

260—397.3, 397.4, 397.47

UNITED STATES PATENT OFFICE
CERTIFICATE OF CORRECTION

Patent No.  3,644,341                  Dated  February 22, 1972

Inventor(s)  John H. Fried

It is certified that error appears in the above-identified patent and that said Letters Patent are hereby corrected as shown below:

Column 1, line 42, after "hydrolyzable" and before "and" insert -- ester, --.
Column 3, line 57, "the 3-alkoxy-$\Delta^{35}$-6-" should be -- the 3-alkoxy-$\Delta^{3,5}$-6- --.
Column 4, line 13, "Formula II" should be -- Formula III --.
Column 8, line 65, "dioxy-21-" should be -- dioxy)-21- --.
Column 9, line 9, "6α,6β-difluoro-3',3'-" should be -- 6α,6β-difluoro-(3',3'- --.
Column 10, line 57, "6α,6β-difluoro-16β-methylpregna-1,4-diene-3,20-dione;" should be -- 6α,6β-difluoro-16α-methyl-17α-hydroxypregn-4-ene-3,20-dione; --.
Column 14, line 9, the definition of "$R^6$" in Claim 1 should appear as follows:
-- $R^6$ is O= or the group $R^7\underset{|}{\overset{H}{\phantom{|}}}$ --.

Signed and sealed this 19th day of December 1972.

(SEAL)
Attest:

EDWARD M.FLETCHER,JR.                 ROBERT GOTTSCHALK
Attesting Officer                     Commissioner of Patents